US007121944B2

(12) United States Patent
Gauselmann

(10) Patent No.: US 7,121,944 B2
(45) Date of Patent: Oct. 17, 2006

(54) GAMING MACHINE HAVING MEANS TO CHANGE THE BRIGHTNESS OF ITS LIGHTS

(75) Inventor: Paul Gauselmann, Moorweg 11 32339, Espelkamp (DE)

(73) Assignee: Paul Gauselmann, Espelkamp (DE)

(*) Notice: Subject to any disclaimer, the term of this patent is extended or adjusted under 35 U.S.C. 154(b) by 651 days.

(21) Appl. No.: 10/302,072

(22) Filed: Nov. 21, 2002

(65) Prior Publication Data

US 2003/0144051 A1 Jul. 31, 2003

(30) Foreign Application Priority Data

Nov. 28, 2001 (DE) ................................ 101 58 367

(51) Int. Cl.
*A63F 13/08* (2006.01)
*H05B 41/38* (2006.01)
*G09G 3/24* (2006.01)
*G09G 5/10* (2006.01)

(52) U.S. Cl. .......................... 463/30; 463/47; 315/149; 345/102; 345/207

(58) Field of Classification Search .................. 463/16, 463/17, 18, 19, 20, 21, 22, 30, 31, 36, 37; 345/77, 75.2, 82, 84, 207
See application file for complete search history.

(56) References Cited

U.S. PATENT DOCUMENTS 4,205,847 A * 6/1980 Steiger et al. ................. 463/5
5,030,943 A * 7/1991 Anglin ....................... 345/102
5,337,073 A * 8/1994 Tsunoda et al. ............ 345/102
5,440,208 A * 8/1995 Uskali et al. ............ 315/169.3
5,586,936 A * 12/1996 Bennett et al. ............... 463/25
5,695,188 A * 12/1997 Ishibashi ................ 273/143 R
5,803,453 A * 9/1998 Stephan et al. .......... 273/138.2
5,854,542 A 12/1998 Forbes ....................... 315/291
5,952,992 A * 9/1999 Helms ........................ 345/102
5,976,017 A * 11/1999 Omori et al. ................. 463/32
5,984,780 A * 11/1999 Takemoto et al. ............ 463/20
6,069,597 A * 5/2000 Hansen ...................... 345/74.1
6,075,574 A * 6/2000 Callway ..................... 348/673
6,135,884 A * 10/2000 Hedrick et al. ............... 463/20
6,195,016 B1 * 2/2001 Shankle et al. ........ 340/815.42
6,243,645 B1 * 6/2001 Moteki et al. .............. 701/211
6,299,534 B1 * 10/2001 Breeding et al. ............. 463/25
6,771,256 B1 * 8/2004 Abraham et al. ........... 345/204
2002/0118182 A1 * 8/2002 Luther Weindorf ......... 345/204

FOREIGN PATENT DOCUMENTS

GB 2 266 141 A * 10/1993
GB 2 365 191 A 2/2002
WO WO 97/27576 * 7/1997

* cited by examiner

OTHER PUBLICATIONS

Combined UK Search and Examination Report, 4 pages.

*Primary Examiner*—Xuan M. Thai
*Assistant Examiner*—Matthew D. Hoel
(74) *Attorney, Agent, or Firm*—Patent Law Group LL

(57) ABSTRACT

The ambient brightness around a gaming machine is determined by a light sensor, which is preferably located on the gaming machine. The sensor signal is used to control a power supply for the lights in the gaming machine such that the brightness of all displays and/or symbols of the gaming machine is optimum for the ambient brightness. In a further embodiment of the present invention, the energizing voltage to the lights is automatically increased over time to offset the natural diminishing of the light's output over time. In another embodiment, the brightness of the lights may be adjusted by the player.

22 Claims, 1 Drawing Sheet

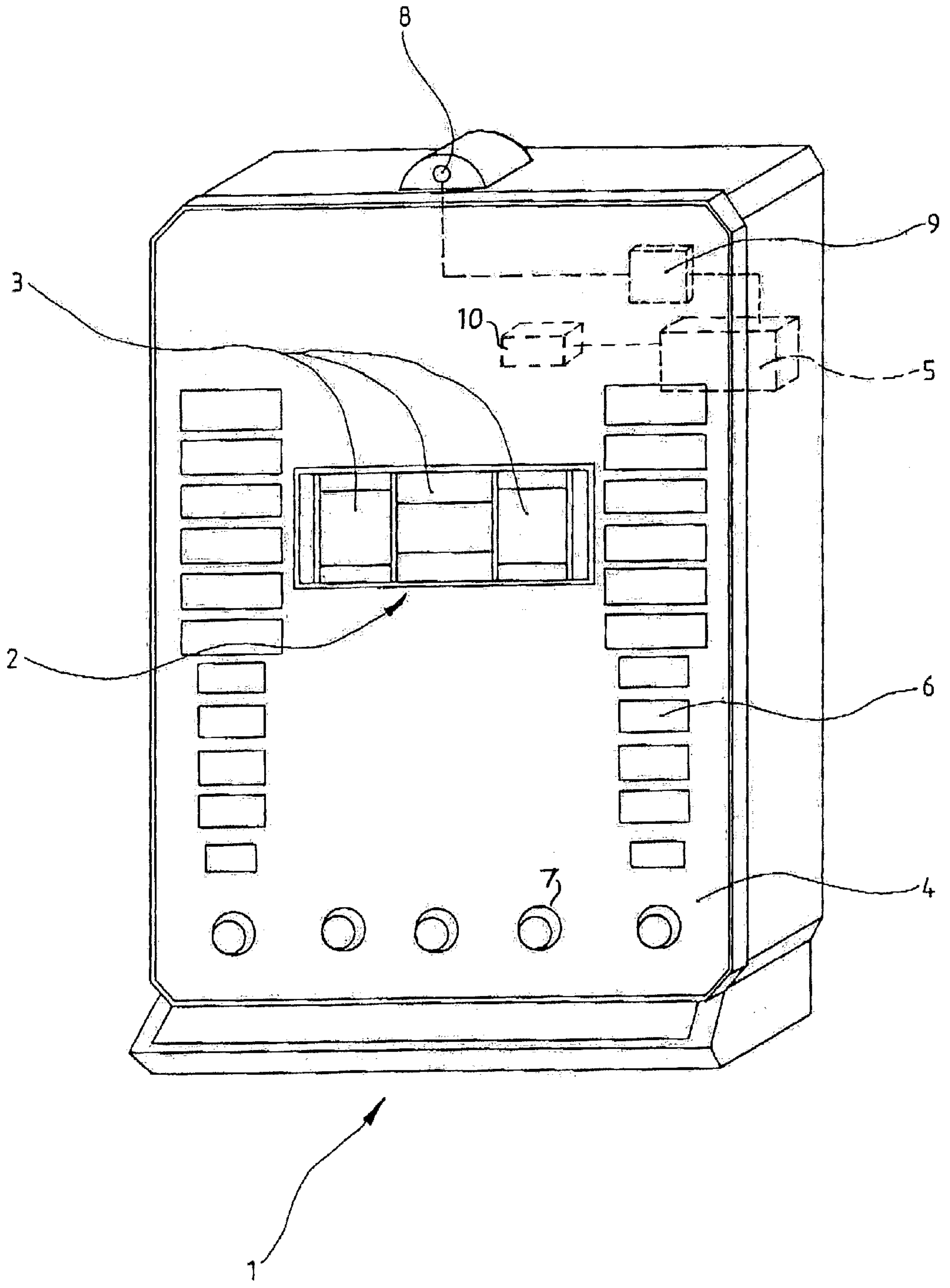
8
9
3
10
5
2
6
7
4
1

GAMING MACHINE HAVING MEANS TO CHANGE THE BRIGHTNESS OF ITS LIGHTS

FIELD OF INVENTION

The invention is related to a gaming machine and, in particular, to a means for changing the brightness of lights in the machine.

BACKGROUND

From the German publication DE 34 44 148 C2, a coin operated gaming machine is known comprising at least two win-displays, each in form of a risk ladder. The risk ladder comprises a translucent display for displaying associated awards in ascending order. Each display is illuminated by one or more lights that are controlled by the gaming machine's control unit. A problem is that, in bright ambient light, the displays are not adequately bright. Permanently increasing the brightness of the lights may make the lights too bright in low ambient light. Further, the intensity of the lights declines over the life of the gaming machine.

The gaming machine of the present invention has the advantage that the lights that illuminate the symbols and awards are of an optimum brightness for the ambient lighting.

SUMMARY

In the present invention, the ambient brightness around the gaming machine is determined by using an opto-electronic sensor located on the gaming machine. The sensor senses the ambient light and controls the effective voltage to the lights of the gaming machine such that the brightness of all displays and/or symbols of the gaming machine is optimum for the ambient brightness.

An integrator smoothes the output signal of the sensor so that transient variations of the brightness around the gaming machine will not cause a change in the brightness of the lights of the gaming machine.

In a further embodiment of the present invention, the energizing voltage to the lights is automatically increased over time to offset the natural diminishing of the light's output over time. In another embodiment, the player can select the brightness of the lights.

BRIEF DESCRIPTION OF THE DRAWING

The FIGURE is a perspective view of the front of a gaming machine incorporating the invention.

DETAILED DESCRIPTION

The invention is described in conjunction with the drawing. The drawing illustrates one of the many types of gaming machines that benefit from the present invention.

A coin operated gaming machine 1 comprises a display 2 located behind a window 3 of a front glass 4 of the gaming machine 1. The display 2 comprises three reels displaying symbols. Each reel is actuated by a stepper motor and stopped at a pseudo-randomly determined position. A control unit 5 controls the determination of pseudo-random numbers and stop positions, controls energizing signals to the stepper motor of each reel to achieve the predetermined stop positions, and controls the activation of the lights that illuminate the display 2 and the symbols on the reels. Other lights may be incorporated in the gaming machine 1. The control unit 5 may comprise one or more microcomputers and/or any other suitable circuit. Particular combinations of symbols displayed by the three reels are sensed by well known means and cause the gaming machine 1 to grant an award to the player.

Below the display 2, there are control elements 7 (e.g., buttons) connected to the control unit 5 that can be used to play the game. The control elements 7 may include a bet button, a spin reels button, a cash-out button, and a brightness control button.

Adjacent to the display 2 there are translucent displays 6 which can be illuminated from behind by bulbs or LEDs to display awards. The control unit 5 activates and deactivates the lights illuminating the displays 6 depending on the award to be displayed.

The lights attributed to the reels and to the displays 6 on the front glass 4 are controlled by a light controller. The controller comprises an 8×8 array of thyristors, where the thyristors can be addressed to turn on or off any combination of sixty-four lights. The thyristors selectively couple a light to a switching power supply 10. The power supply 10 comprises a conventional pulse-width modulated (PWM) switching voltage regulator that receives a control signal for controlling the duty cycle of the power supply output voltage. Any of the sixty-four lights can be supplied clocked pulses of 40 volts. By controlling the duty cycle of the 40 volt pulses, the effective voltage to the lights is adjustable to control the brightness of the lights. In one embodiment, the average effective voltage applied to the lights is about 6 volts.

On the housing of the gaming machine 1 there is an optical sensor 8 connected to the control unit 5 that determines the ambient brightness around the gaming machine 1. The sensor 8 may be a photoresistor, a photodiode, a phototransistor, or any other suitable sensor.

The output signal of the sensor 8 is received by the control unit 5 and compared with a predetermined reference value. Depending on the deviation from the predetermined reference value, the duty cycle (pulse width) of the lights' energizing voltage is adjusted to control the brightness of the lights such that the brightness is optimum for the ambient conditions. For example, if the ambient brightness is increased, the deviation from the reference value will change, causing the control unit 5 to increase the duty cycle to cause the brightness of the lights to increase to the optimum level. If the surrounding brightness of the gaming machine decreases, the brightness of the lights will be reduced by reducing the duty cycle.

The duty cycle adjustment may be obtained using a simple ratio of the deviation signal to the desired duty cycle control signal. For example, the duty cycle may be gradually adjusted while comparing the control signal (or a corresponding value) to the deviation signal. When there is a match, the adjusting stops. More complex algorithms or a look-up table memory may also be used.

To prevent a transient change in the surrounding brightness causing a change in the brightness of the lights, an integrator 9 connected to the sensor's 8 signal filters out such short term changes in the signal.

The control unit 5 may comprise more than one processor or logic circuit, such as one for running the gaming machine program and another for additional controls, such as controlling the lights.

In a further embodiment of the present invention, the control unit 5 of the gaming machine 1 includes a real time clock. The year, the month, the day, and the time may be determined with this real time clock. To compensate for the normal aging effects of the lights, the control unit 5 will increase the effective (average) voltage to the lights (by increasing the duty cycle of the pulses) a predetermined amount after a certain time period, for example, after one year, to maintain the brightness of the lights at their original level. Further adjustments may be made as the gaming machine ages.

In another embodiment of the present invention, the brightness of the lights of the gaming machine 1 can be adjusted by a player activating one or more control elements 7. In one embodiment, there are sixteen steps to adjust the brightness from low to very high. By repeatedly operating the "increased brightness" control element 7 (e.g., pressing the button), the player of the gaming machine 1 can increase the brightness of the lights. There may be separate controls for different portions of the lights. A "decrease brightness" control element 7 is also provided. A single control element 7 for adjusting the brightness up or down is also envisioned.

Having described the invention in detail, those skilled in the art will appreciate that, given the present disclosure, modifications may be made to the invention without departing from the spirit of the inventive concepts described herein. Therefore, it is not intended that the scope of the invention be limited to the specific embodiments illustrated and described.

What is claimed is:

1. A device comprising:

a light sensor for detecting ambient light around a money-operated gaming machine and generating a first signal corresponding to the ambient light, the gaming machine comprising an illuminated display for displaying a game of chance and one or more selectively illuminated features, the one or more selectively illuminated features being illuminated based an a status of a game being played;

a circuit connected to receive the first signal, the circuit outputting a control signal based on the first signal;

a power supply connected to receive the control signal for controlling an output of the power supply; and at least one light within a gaming machine receiving power from the power supply, the at least one light illuminating the display of the game of chance and the one or more selectively illuminated features, a brightness of the at least one light being controlled such that an increased ambient brightness increases the brightness of the at least one light, and a decreased ambient brightness decreases the brightness of the at least one light, wherein the light sensor comprises an integrator for preventing transient changes in ambient light from substantially affecting the brightness of the lights.

2. The device of claim 1 further comprising a gaming machine containing the at least one light.

3. The device of claim 1 wherein the at least one light comprises at least one light emitting diode.

4. The device of claim 1 wherein the at least one light comprises at least one light bulb.

5. The device of claim 1 wherein the at least one light illuminates reels in the gaming machine.

6. The device of claim 1 wherein the at least one light comprises at least one light backlighting a display in the gaming machine.

7. The device of claim 1 wherein the circuit comprises a processor.

8. The device of claim 1 wherein the power supply is a switching power supply, and the control signal controls a duty cycle of the power supply.

9. The device of claim 1 further comprising a plurality of switches connected to the power supply for controlling which of the at least one light receives power from the power supply.

10. The device of claim 1 wherein the light sensor is affixed to the gaming machine.

11. The device of claim 1 wherein the circuit compares the first signal to a reference value to determine the level of ambient light.

12. The device of claim 1 wherein the power supply outputs pulses, and wherein the brightness of the at least one light is controlled by pulse width modulation.

13. The device of claim 1 wherein the sensor is one of a photoresistor, a photodiode, and a phototransistor.

14. A device comprising:

a light sensor for detecting ambient light around a money-operated gaming machine and generating a first signal corresponding to the ambient light, the gaming machine comprising an illuminated display for displaying a game of chance and one or more selectively illuminated features, the one or more selectively illuminated features being illuminated based on a status of a game being played;

a circuit connected to receive the first signal, the circuit outputting a control signal based on the first signal;

a power supply connected to receive the control signal for controlling an output of the power supply;

at least one light within a gaming machine receiving power from the power supply, the at least one light illuminating the display of the game of chance and the one or more selectively illuminating features, a brightness of the at least one light being controlled such that an increased ambient brightness increases the brightness of the at least one light, and a decreased ambient brightness decreases the brightness of the at least one light; and a real time clock source, the clock source providing a signal to the circuit, the circuit for controlling the power supply to increase power to the at least one light to offset a degradation in brightness of the at least one light over time.

15. The device of claim 1 wherein the at least one light identifies an award value.

16. The device of claim 1 further comprising a player controller for receiving a player input for adjusting the brightness of the at least one light.

17. The device of claim 16 wherein the player controller comprises a button.

18. The device of claim 16 wherein actuating the player controller adjusts the brightness in steps.

19. A method for operating a gaming machine comprising:

sensing ambient light around a money-operated gaming machine, the gaming machine comprising an illuminated display for displaying a game of chance and one or more selectively illuminated features, the one or more selectively illuminated features being illuminated based on a status of a game being played;

generating a first signal corresponding to the ambient light;

generating a power supply control signal based on the first signal;

applying the control signal to a power supply to control an output of the power supply;

applying the output of the power supply to at least one light within a gaming machine, the at least one light illuminating the display of the game of chance and the one or more selectively illuminated features, a brightness of the at least one light being controlled such that an increased ambient brightness increases the brightness of the at least one light, and a decreased ambient brightness decreases the brightness of the at least one light; and integrating a signal from a light sensor for sensing ambient light for preventing transient changes in ambient light from substantially affecting the brightness of the at least one light.

20. A method for operating a gaming machine comprising:

sensing ambient light around a money-operated gaming machine, the gaming machine comprising an illuminated display for displaying a game of chance and one or more selectively illuminated features, the one or more selectively illuminated features being illuminated based on a status of a game being played;

generating a first signal corresponding to the ambient light;

generating a power supply control signal based on the first signal;

applying the control signal to a power supply to control an output of the power supply;

applying the output of the power supply to at least one light within a gaming machine, the at least one light illuminating the display of the game of chance and the one or more selectively illuminated features, a brightness of the at least one light being controlled such that an increased ambient brightness increases the brightness of the at least one light, and a decreased ambient brightness decreases the brightness of the at least one light; and controlling the power supply to increase power to the at least one light to offset degradation in brightness of the at least one light over time.

21. The method of claim 19 further comprising the gaming machine receiving a player input for adjusting the brightness of the at least one light.

22. The method of claim 21 wherein the player input adjusts the brightness of the at least one light in steps.

* * * * *